May 10, 1927.
J. S. FASTING
1,627,553
METHOD OF TREATING WET RAW MATERIALS IN THE MANUFACTURE OF CEMENT
Original Filed Nov. 30, 1923   5 Sheets-Sheet 1
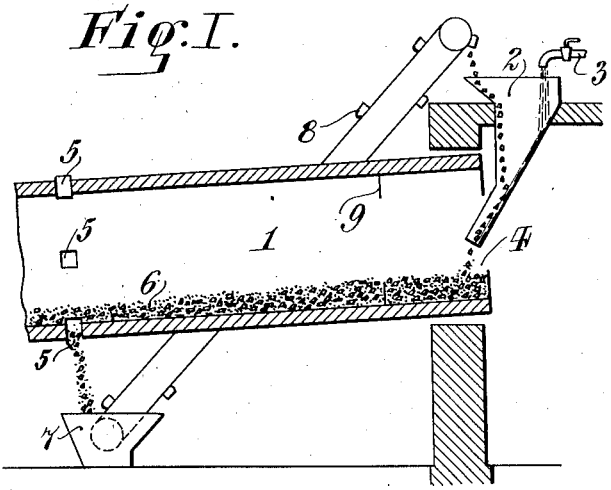
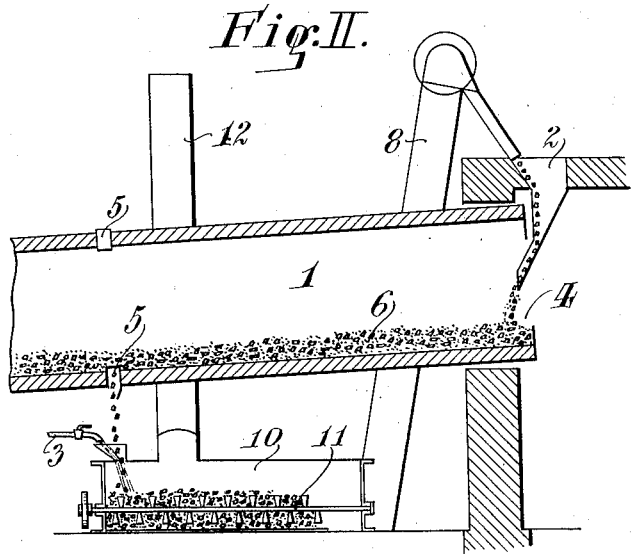

May 10, 1927.  1,627,553
J. S. FASTING
METHOD OF TREATING WET RAW MATERIALS IN THE MANUFACTURE OF CEMENT
Original Filed Nov. 30, 1923   5 Sheets-Sheet 2
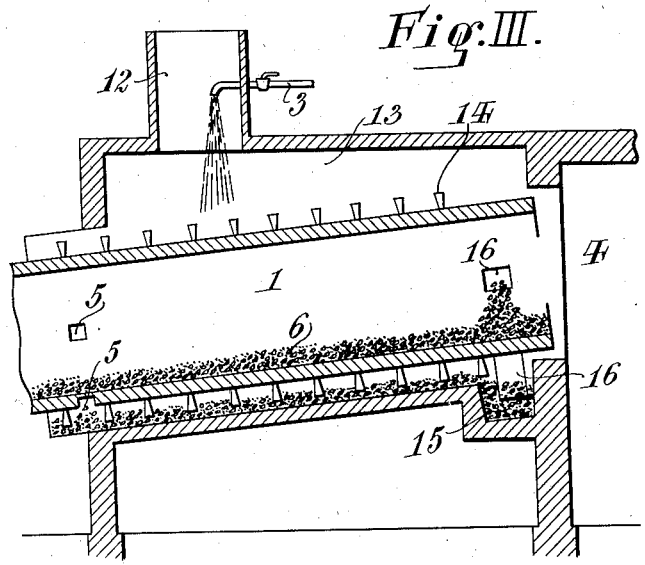
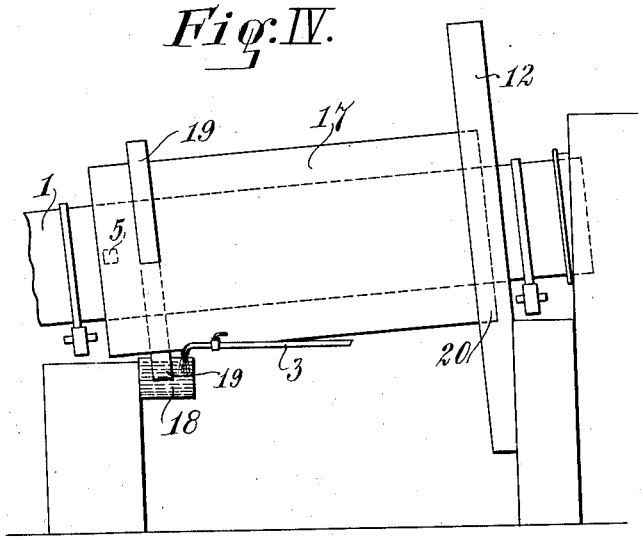
Inventor
Johan S. Fasting
By his Attorney May 10, 1927.          J. S. FASTING          1,627,553
METHOD OF TREATING WET RAW MATERIALS IN THE MANUFACTURE OF CEMENT
Original Filed Nov. 30, 1923    5 Sheets-Sheet 3
*Fig. V.*
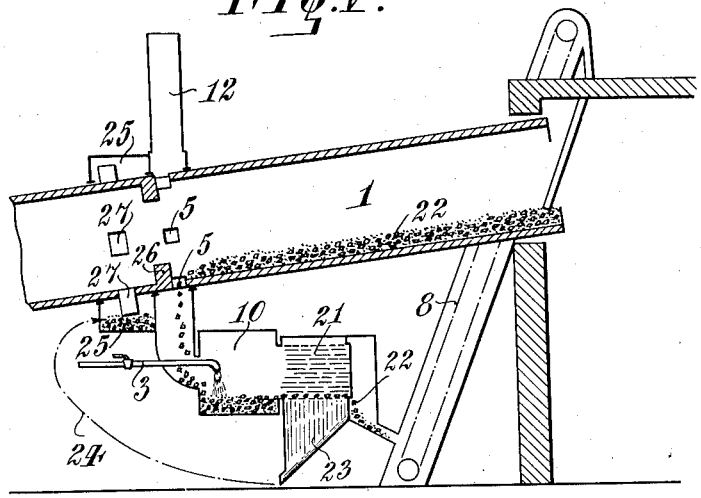
*Fig. VI.*
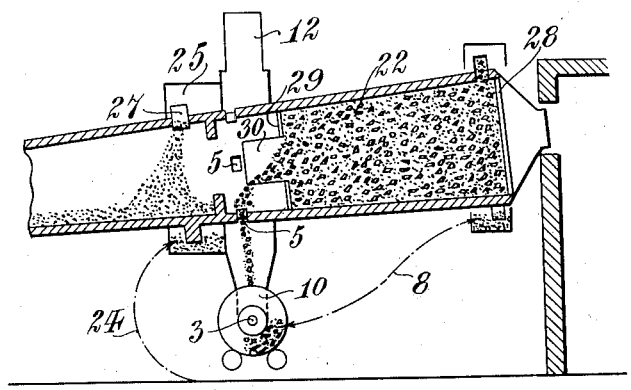

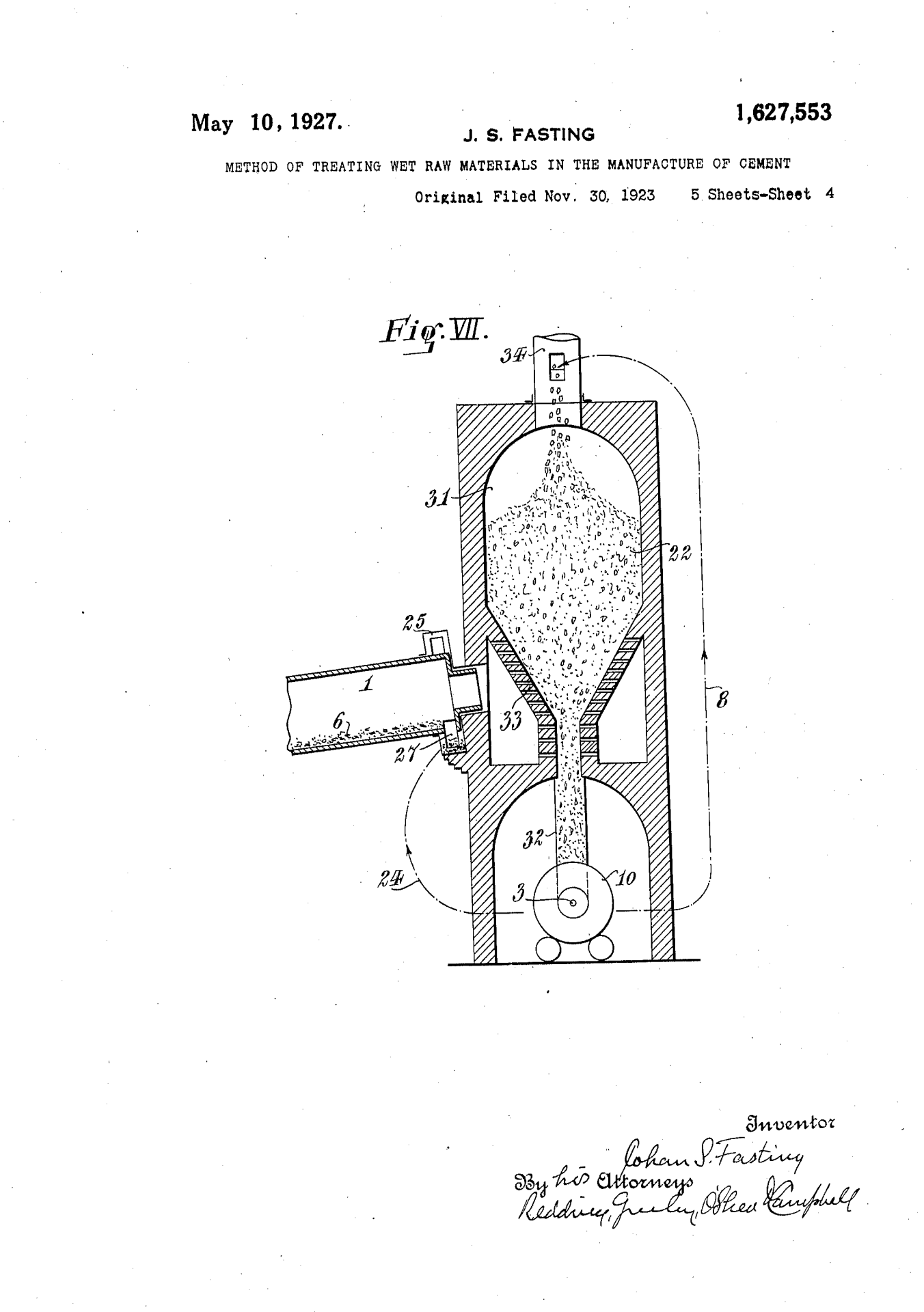

Fig. VII.

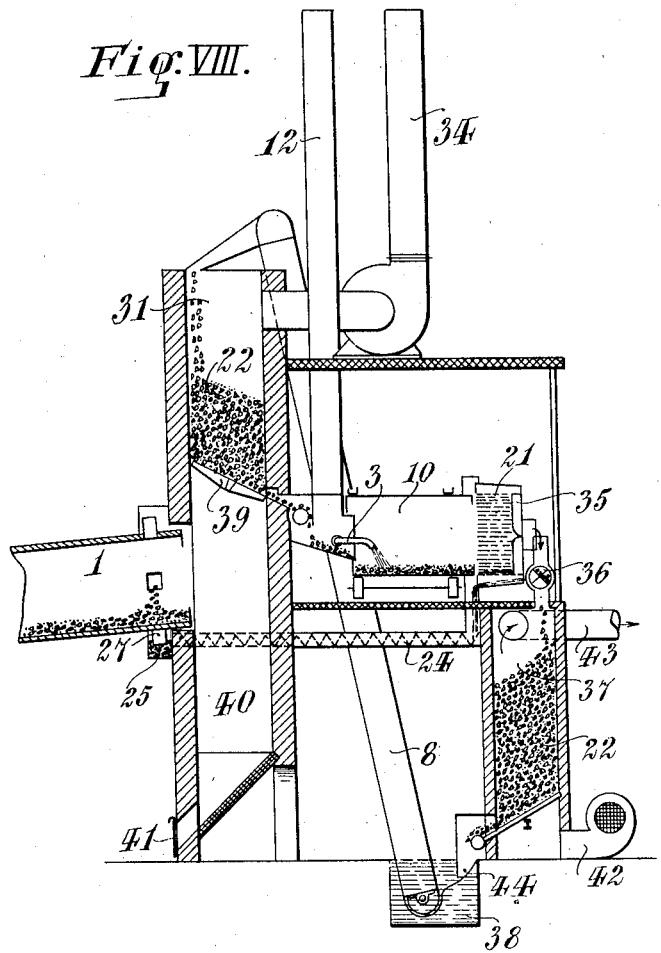

Patented May 10, 1927.

1,627,553

UNITED STATES PATENT OFFICE.

JOHAN SIGISMUND FASTING, OF VALBY, NEAR COPENHAGEN, DENMARK, ASSIGNOR TO F. L. SMIDTH & CO., OF NEW YORK, N. Y., A CORPORATION OF NEW JERSEY.

METHOD OF TREATING WET RAW MATERIALS IN THE MANUFACTURE OF CEMENT.

Original application filed November 30, 1923, Serial No. 677,617, and in Denmark December 22, 1922. Divided and this application filed April 9, 1925. Serial No. 21,790.

The present invention relates to the drying and burning in rotary kilns of wet raw materials, such as cement slurry, in such a way that the main advantages of the two known methods of making cement, for example, the wet method and the dry method, are attained simultaneously, that is, the raw material can be prepared in a wet state whereas the burning or clinkering can take place in a kiln arranged for the dry process. The special advantages are that on the one hand by preparing the raw materials wet an absolutely homogeneous product of the right composition is secured, and that on the other hand the dry kiln used can be shorter than is required for burning wet material, a saving in coal or an increase in output or both being obtained.

The commonly used method of burning wet raw material requires a kiln of greater length than is suggested here, that is, besides the heating zone, the calcining zone, and the burning zone, a drying zone for the evaporation of the water contained in the raw material must be provided for and a kiln of this description may under certain circumstances involve considerable loss of heat. It has been attempted to explain the necessity of having a longer kiln for wet burning than for dry burning by the fact that the products of combustion will require longer time for effectively acting upon the wet material, such as slurry, to be calcined, especially because the pressure of the steam formed in the material to be burnt will prevent the hot products of combustion from penetrating into the same, and the hot products of combustion consequently will only act quite superficially. The loss of heat mentioned above and which under certain conditions arises in the usual wet burning of material in the form of slurry is partly due to the fact that the steam formed will wastefully take up heat from the flue gases in being superheated to the temperature of the products of combustion. If the raw material could give off its steam to the atmosphere directly instead of to the flue gases such loss of heat could be avoided.

According to the present invention the steam developed in the drying of the wet material is developed outside of the kiln or of the heating zone of the kiln and the loss of heat in raising the temperature of the steam is avoided and the hot gases give off their heat directly to dry material instead of to the wet and thereby deliver the quantity of heat required to the material to be burnt in a far shorter length of the kiln than is otherwise possible.

In accordance with the invention, the transmission of the heat in the gases to the wet material for drying the same is effected indirectly or outside of the heating zone by means of bodies which are themselves heated by the hot gases from the zone in the kiln where the carbonic acid is driven out and are then brought into direct contact with the wet material so that in this way such bodies act as a heat-transmitting intermediary; these bodies may be of metal or other material or they may consist of artificial stone or the like, or they may be part of the dried and heated raw material itself.

The influence of the heat-transmitting bodies upon the wet material may according to circumstances be effected in the kiln itself, but outside of the heating zone, the bodies being in that case fed into the upper or feeding end of the kiln together with the raw material, or in a separate chamber outside the kiln which receives the wet material. This arrangement affords the advantage that all steam formed is set free at a temperature of only about 100° C., whereby any loss of heat from the products of combustion by superheating of steam is avoided, and further affords the advantage that the products of combustion from the kiln are kept perfectly free of moisture while the steam itself is kept free of products of combustion, and the heat of the latter thereby can very easily be utilized for any desired purpose.

If a separate drying device is used outside of the kiln in connection with the bodies for transmitting the heat, the dried raw meal from the drying device can to advantage be separated and taken directly to a point in the kiln at a suitable temperature instead of being returned together with the bodies to the gas outlet of the kiln. In this latter case it is also possible to provide that this end of the kiln shall be kept filled with bodies throughout its cross section, the bodies thus also acting as a filter for the dust formed in the products of combustion from the finished product, this filtering capacity being so much more increased if the bodies are moistened beforehand. A filter as described, formed by the heat-transmitting bodies, may also be arranged outside of the rotary kiln proper, as in a shaft or chamber through which the hot gases from the rotary kiln are led. From this shaft or chamber the bodies will pass down into the drying device, where they effect the drying of the slurry. However, part of the bodies may be taken to another shaft or chamber, which may then be used as a recuperator for transmitting the heat from the gases taken up by the bodies to a medium which is led through this latter shaft or chamber to be utilized in different ways, say as preheated air to support combustion in the kiln proper or for a boiler.

The arrangement may also be such that the heat-transmitting bodies are led to the recuperator not directly from the heating shaft or chamber but from the drying chamber.

When the products of combustion are sufficiently hot a lowering of their highest temperature may be utilized in various ways before they are used for heating the bodies, say in a recuperator, a boiler plant, etc.

Several embodiments of the invention are illustrated in the accompanying drawings, in which—

Figs. I, II and III illustrate in longitudinal section three different forms of apparatus in which the invention may be practiced.

Fig. IV is a view in elevation of another form of apparatus.

Figs. V, VI, VII and VIII illustrate in longitudinal section four other forms of apparatus.

In the apparatus shown in Fig. 1, the wet raw material, in this instance in the form of slurry, is introduced into the upper end of the kiln 1 through a hopper 2 from a supply pipe 3. The end of the kiln is enclosed in a dust chamber 4 from which the products of combustion pass into the chimney. At some distance from the end of the kiln, for instance where the temperature in the kiln is about 1000° C., openings 5 are provided in the shell of the kiln through which openings part of the material 6 moving towards the zone where the carbonic acid is driven out falls down into a receptacle 7, from which the material having now a temperature of about 700—800° C. is taken by means of a conveying mechanism 8 back to the hopper 2 through which it is again introduced into the kiln together with the slurry. This exceedingly hot material will then effect a very quick evaporation of the water in the slurry, without substantial loss of heat through superheating of the steam which is developed. The kiln is provided with a check ring 9, and the evaporation will principally take place between this ring and the outlet end of the kiln so that the heating of the material 6 beyond 100° C. will set in when the material has passed the said ring. As the drying chamber thus formed is at the extremity of the kiln and the steam developed passes directly from the kiln, no heat is wasted through absorption in the steam.

In the form of apparatus shown in Fig. II the drying of the slurry is not effected in the end of the kiln as in the form of apparatus shown in Fig. I but in a separate chamber 10 outside of the kiln, the arrangement being otherwise the same. The chamber 10 receives the slurry from the pipe 3 and the heated material under treatment which escapes through the openings 5 in the kiln shell. The two materials, that is, the slurry and the already heated material, being thus brought into intimate contact with each other, are then moved through the chamber 10 by a conveyor 11 to the elevator 8 and thence to the feeding hopper 2.

This latter arrangement possesses, among others, the advantage that the products of combustion passing on to the chamber 4 are perfectly free from steam, since all the steam leaves the chamber 10 through the chimney 12. The gases of combustion are therefore not only very hot but also absolutely free from water, and the loss of heat in superheating the steam is avoided. The heat in the steam can easily be utilized due to the fact that the steam is free from the gases of combustion.

In the form of apparatus shown in Fig. III, which in the main is the same as that shown in Fig. II, the drying chamber surrounds the end portion of the kiln, the chamber consisting of an enclosed space 13 through which the kiln end extends right to the chamber 4. The outside of the shell within this chamber is provided with inclined shovels 14 which at the bottom of the chamber 13 act as conveyors, moving the heated material 6 which falls through the openings 5 together with the slurry fed through the pipe 3 into a pit 15 in the rear end of the chamber from which pit the dried material is again introduced into the kiln through lifters 16.

The form of apparatus shown in Fig. IV corresponds in the main to that in Fig. III, with the exception that as shown in Fig. IV the drying chamber surrounding the end portion of the kiln in this case consists of a drum 17 which rotates together with the kiln proper. The slurry is fed through the pipe 3 to a pit 18 from which by means of shovels or lifters 19 it is lifted into the drying chamber between the kiln 1 and the drum 17. The steam developed in the drying chamber is discharged into a stationary chamber 20 surrounding the extreme end of the drying drum 17 and from the chamber 20 the steam escapes through the chimney 12.

The form of apparatus shown in Fig. V is a modification of that shown in Fig. II, Fig. V likewise showing a drying chamber 10 outside of the kiln into which the slurry is introduced through the pipe 3 together with heated material discharged through the openings 5 in the shell of the kiln, but the drying chamber 10 in this present case is shown as a rotary drum to the discharge end of which a screening device 21 is connected. An apparatus of this latter description is intended to be operated in a somewhat different manner, in that it is not the heated raw material proper which is led from the kiln through the drying chamber for the purpose of drying the wet raw material but bodies 22 which are constantly being fed through the upper end of the kiln and there heated by the hot gases. This is the reason why the screening drum 21, or its equivalent, has been added, said drum effecting a separation between the named heat-transmitting bodies 22 (which by means of the lifting device 8 are introduced anew into the kiln) on the one side, and the dried—mainly pulverized—raw material on the other side which passes down into a hopper 23 arranged under the screening drum and thence, by means of suitable conveyor devices 24 (in the drawing indicated by a broken line) is taken to a chamber 25. This latter chamber surrounds the kiln a little to the left of or below the openings 5 through which the heat-transmitting bodies 22 leave the kiln, a check ring 26 being provided for preventing them from passing into the burning zone of the kiln. From the chamber 25 the dried raw material by means of devices 27 is introduced into the burning zone.

Fig. VI shows a form of apparatus which is likewise arranged for the use of special bodies as heat-transmitting means, that is, for conveying the heat of the flue gases to the slurry in a chamber 10 outside of the kiln. In the main, the arrangement is the same as that shown in Fig. V, but the apparatus shown in Fig. VI provides for such a great charge of special heating bodies 22 that they will fill the whole cross section of the kiln end, being prevented from falling out through the gas outlet end of the kiln by means of a grate 28 and from passing into the burning zone of the kiln by means of another grate 29 with an outlet device 30. By this arrangement the gases will be very much cooled down, so that the same economy is attained as by burning in a vertical kiln.

It will be observed as a further advantage that special heating bodies will act as a filter for the smoke gases, retaining the finished cement dust and the unburnt particles of coal present in the gases, which will next pass into the drying chamber from which they are returned to the kiln.

The same main idea is the basis of the apparatus shown in Fig. VII, but in a somewhat altered form, the heating of the foreign bodies 22 in this latter case taking place in a vertical shaft or chamber 31 which receives the hot gases from the outlet end of the kiln 1. The bottom of the shaft is hopper-shaped and the heat-transmitting bodies 22 pass from this through a funnel 32 into the drying chamber 10; the lower portion of the hopper is provided with holes 33 through which the gases from the kiln enter into the interior of the shaft, passing through the interstices between the bodies 22 and escaping through a chimney 34.

The form of apparatus shown in Fig. VIII is a modification of that shown in Fig. VII in so far that in the form shown in Fig. VIII a separate shaft heater 31 is provided, in which the foreign bodies 22 are heated by the gases passing from the kiln 1 through the shaft 31 to a chimney 34. In this form too a drying chamber 10 is provided into which the slurry is introduced through the pipe 3, the drying chamber having associated with it a screening device 21 from which the dried material, through a worm conveyor 24, a chamber 25 surrounding the kiln end, and lifters 27 enters the kiln. From the screening device 21 the heating bodies, by means of shovels or lifters 35, are lifted to a feeding device 36, which takes them into a chamber 37 from which they pass down into a pit 38 and are passed back again to the heater 31 by an elevator 8. The heater 31 is provided with a bottom grate 39 above a chamber 40 in which may be collected potash and other salts which may be present in the gases from the kiln 1 and will be taken up by the foreign bodies 22 and afterwards shaken loose from them at the grate 39. The material accumulated in this way can be removed from time to time through a door 41 or the like.

The heat-transmitting bodies 22 after having passed the drying drum 10 still retain a considerable quantity of heat, and the purpose of taking them through a separate chamber 37 is to utilize this heat by transmitting the same to air, which is blown into the bottom of the same by means of a fan 42, and leaves from the top of the chamber through a pipe 43. Air having been heated this way may for instance be used to support combustion in a boiler plant or in the burning kiln proper or for any other suitable purpose. In order to prevent the access of atmospheric air to the chamber 37 otherwise than through the fan 42 and the outlet pipe 43 the pit 38 may be kept filled with water, thus forming a trap for the outlet opening 44 for the bodies from the chamber 37 to the pit and for the inlet into the chamber 31, and it is for this purpose also that the bodies are introduced into the chamber through the feeding device 36.

The apparatus shown in Fig. VIII is so arranged that the bodies 22 before reaching the chamber 37 have all passed through the drying drum 10. However, this is not absolutely necessary, as the bodies may also be taken directly from the chamber 31 to the chamber 37 so that the drying drum 10 and the air heating device 37 will work in parallelism.

The pit 38 may just as well be kept filled with slurry which will then form a coating on the bodies 22 and, consequently, the slurry will be dried to some degree already in the chamber 31 through the direct influence of the hot gases.

With regard to the heat-transmitting bodies which constitute one of the elements in some of the forms of apparatus described it is to be remarked that these can to advantage be so shaped that for a certain volume they have a large surface, but they must always be so shaped that they are not inclined to clog; they may for instance have the form of a pipe; further they must be made of material of great specific heat and great thermal conductivity.

I claim as my invention:

1. In the continuous process of treating wet cement-forming raw materials in a kiln by the direct action thereon of a current of products of combustion maintained through the kiln in a direction towards its inlet end so as to create therein a highly heated zone, utilizing the waste heat of the kiln to heat heat-transmitting bodies, mingling the heat-transmitting bodies so heated with the wet raw material to evaporate the moisture therefrom before it is subjected to the heat of said highly heated zone and delivering the dried and raw material to said highly heated zone, the heat transmitting bodies being again subjected to the waste heat.

2. In the continuous process of heating wet cement-forming material for the manufacture of cement in a kiln, maintaining a current of products of combustion through the kiln in a direction towards its inlet end so as to create therein successively a heating zone, a calcining zone and a burning zone, causing the cement material to be subjected successively to the heat of said zones, utilizing the waste heat of the kiln to heat heat transmitting bodies, mingling the heat transmitting bodies so heated with the wet raw material to evaporate the moisture therefrom before it is subjected to the heat of the calcining zone and delivering the raw material to the calcining zone, the heat transmitting bodies being again subjected to waste heat.

3. In the continuous process of treating wet cement-forming material for the manufacture of cement in a kiln, maintaining a current of products of combustion through the kiln in a direction towards its inlet end so as to create therein successively a heating zone, a calcining zone and a burning zone, causing the cement material to be subjected successively to the heat of said zones, discharging a portion of the heated material from the kiln after it has been subjected to the heat of the heating zone, mingling the heated material so discharged from the kiln with the wet raw material to eliminate the moisture therefrom and delivering the dried raw material to the calcining zone, the heat transmitting bodies being again subjected to the waste heat.

4. In the continuous process of treating wet cement-forming material for the manufacture of cement in a kiln, maintaining a current of products of combustion through the kiln in a direction towards its inlet end so as to create therein successively a heating zone, a calcining zone and a burning zone, causing the cement material to be subjected successively to the heat of said zones, discharging a portion of the heated material from the kiln after it has been subjected to the heat of the heating zone, mingling the heated material so discharged from the kiln with the wet raw material outside the kiln to eliminate the moisture therefrom and delivering the dried raw material to the calcining zone, the heat transmitting bodies being again subjected to the waste heat.

This specification signed this 27th day of March A. D. 1925.

JOHAN S. FASTING.